(12) United States Patent
Hsu

(10) Patent No.: US 8,613,992 B2
(45) Date of Patent: Dec. 24, 2013

(54) PROTECTIVE COVER FOR ELECTRONIC DEVICE

(76) Inventor: Fu Yi Hsu, Taipei Hsien (TW)

( * ) Notice: Subject to any disclaimer, the term of this patent is extended or adjusted under 35 U.S.C. 154(b) by 673 days.

(21) Appl. No.: 12/846,094

(22) Filed: Jul. 29, 2010

(65) Prior Publication Data

US 2010/0288405 A1 Nov. 18, 2010

Related U.S. Application Data

(63) Continuation-in-part of application No. 11/730,938, filed on Apr. 5, 2007, now abandoned.

(30) Foreign Application Priority Data

Feb. 16, 2007 (TW) ................................ 96203200 U

(51) Int. Cl.
*B32B 9/04* (2006.01)
*B32B 7/12* (2006.01)
*D04H 11/04* (2006.01)

(52) U.S. Cl.
USPC ........... 428/40.1; 428/42.1; 428/85; 428/343; 428/354

(58) Field of Classification Search
USPC ............ 428/40.1, 42.1, 85, 90, 91, 343, 354, 428/355 R
See application file for complete search history.

(56) References Cited

U.S. PATENT DOCUMENTS

| | | | |
|---|---|---|---|
| 6,613,411 B2 * | 9/2003 | Kollaja et al. ................. | 428/40.1 |
| 6,977,023 B2 * | 12/2005 | Abrams ......................... | 156/230 |
| 7,740,927 B2 * | 6/2010 | Yousif et al. ................. | 428/40.1 |
| 2006/0240209 A1 * | 10/2006 | Sano ............................ | 428/40.1 |
| 2007/0065620 A1 * | 3/2007 | Nonaka et al. ............... | 428/40.1 |
| 2008/0233326 A1 * | 9/2008 | Hegemier et al. ............ | 428/41.7 |

* cited by examiner

*Primary Examiner* — Patricia Nordmeyer
(74) *Attorney, Agent, or Firm* — Rosenberg, Klein & Lee

(57) ABSTRACT

A protective cover of an electronic device includes a leather layer, which includes an outside surface and a bottom surface. A backing layer integrates with the bottom surface of the leather layer. The protective cover adheres onto the electronic devices, hence, the electronic devices are well protected, and the appearances of the electronic devices are well maintained. The surfaces of the electronic devices cannot be dirtied, scraped, or damaged. Users can feel more comfortable when operating their electronic devices, hence, the worthiness and the usability of the electronic devices are greatly enhanced.

10 Claims, 7 Drawing Sheets

PROTECTIVE COVER FOR ELECTRONIC DEVICE

CROSS-REFERENCE TO RELATED APPLICATIONS

This application is a Continuation-in-Part of application Ser. No. 11/730,938, filed Apr. 5, 2007, and entitled PROTECTIVE COVER FOR ELECTRONIC DEVICE, currently pending.

BACKGROUND OF THE INVENTION

1. Field of the Invention

The present invention relates to a protective cover, and more specifically to a protective cover that adheres onto an electronic device to protect the electronic device.

2. Description of the Prior Art

Nowadays, electronic devices, such as notebook computers/laptops, digital cameras, mobile phones/smart phones, Global Positioning Systems, MP3/MP4 players, portable media players, and PDAs (Personal Digital Assistants), are widely used due to their portable characteristics. However, when they are in use or are being carried, the electronic devices often collide with other objects. Moreover, the surfaces of the electronic devices can be scraped, or, the electronic devices can be damaged. Hence, the appearance of the electronic devices are badly affected, and the inside electronic elements of the electronic devices may be damaged.

Hence, the inventors of the present invention believe that these shortcomings above are able to be improved upon and suggest the present invention which is of a reasonable design and is an effective improvement based on deep research and thought.

SUMMARY OF THE INVENTION

An object of the present invention is to provide a protective cover for an electronic device, and the protective cover adheres onto the electronic device. Hence, the surfaces of electronic devices are prevented from being dirtied, scraped, or damaged, and the appearances of the electronic devices can be well maintained. Moreover, the inside electronic elements of the electronic devices cannot be damaged. The worthiness and the usability of the electronic devices are therefore greatly increased. Users can feel more relaxed about the safety of their electronic devices because that the outer surface of the protective cover is made from leather.

To achieve the above-mentioned object, a protective cover for an electronic device is disclosed. The protective cover comprises a leather layer, and a backing layer. The leather layer comprises an outside surface and a bottom surface and the backing layer integrates with the bottom surface of the leather layer.

The advantages of the present invention are: the protective cover adheres onto the electronic devices, hence, when it is in use or is being carried, the electronic devices are well protected. Other objects are obstructed from colliding directly with the surfaces of the electronic devices. Hence, the surfaces of the electronic devices cannot be dirtied, scraped, or damaged, and the appearances of the electronic devices can be well maintained. Also, the inside electronic elements of the electronic devices cannot be damaged. Moreover, the protective cover having a leather layer is tactile and pleasing to touch and enhances visual effects. Users can feel more comfortable when operating their electronic devices, hence, the worthiness and the usability of the electronic devices are greatly enhanced.

To further understand the features and technical contents of the present invention, please refer to the following detailed description and drawings related to the present invention. However, the drawings are only to be used as references and explanations, and not to limit the present invention.

DETAILED DESCRIPTION OF THE INVENTION

Figure 1:
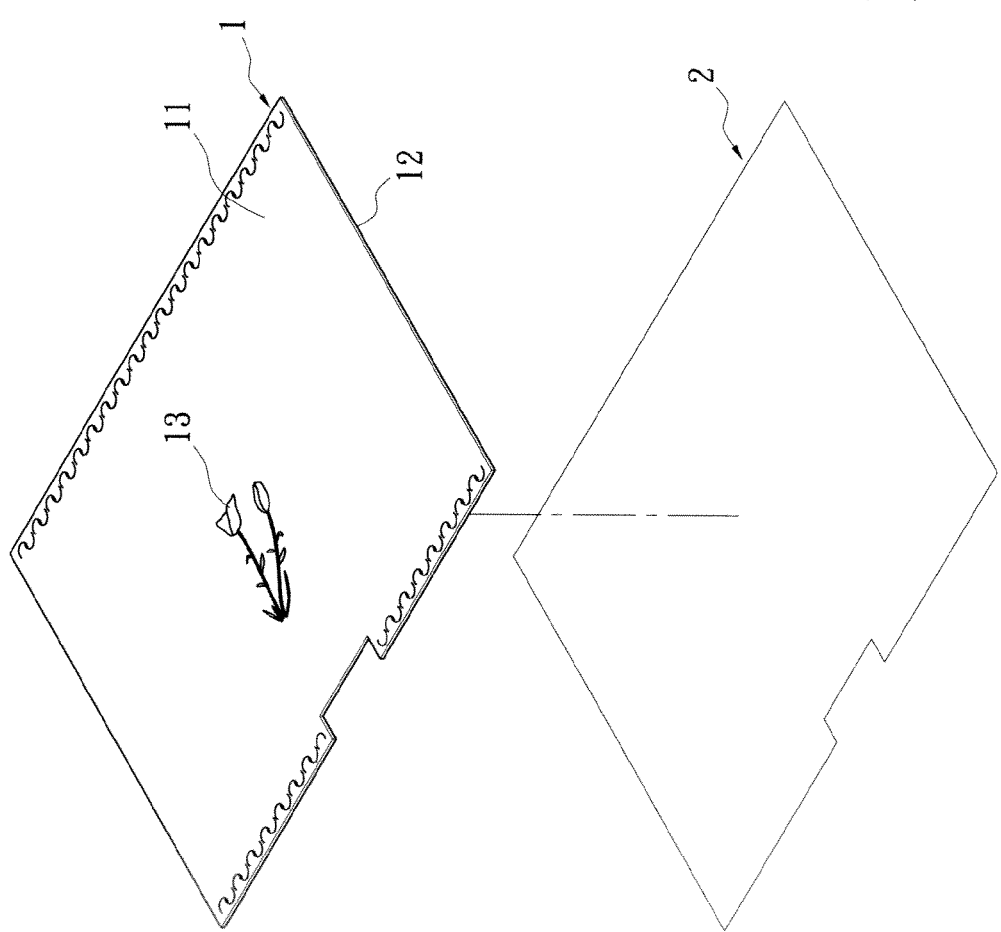
FIG. 1 is an explored isometric view of the protective cover of the present invention.
Figure 2:
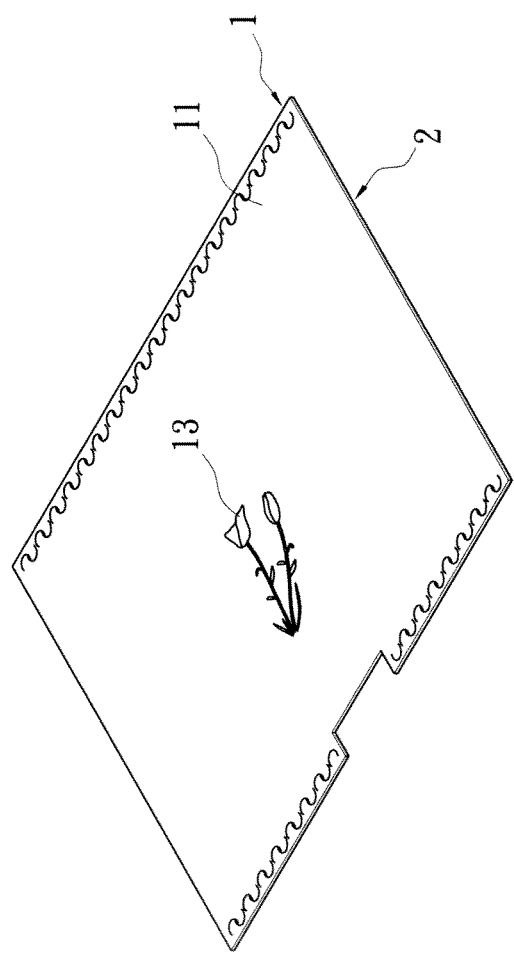
FIG. 2 is an isometric view of the protective cover of the present invention.
Figure 3:
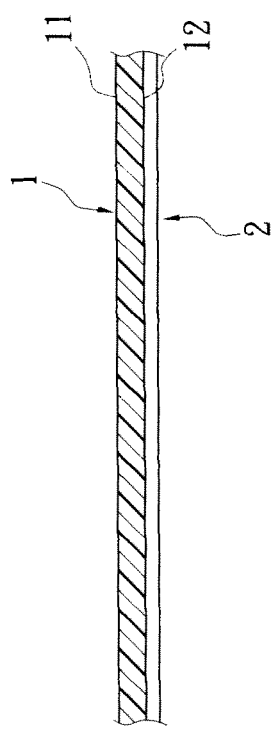
FIG. 3 is a side view of the protective cover of the present invention.

Please refer to FIGS. 1-3, in which a protective cover for an electronic device is shown. The protective cover adheres onto portable electronic devices such as notebook computers, digital cameras, mobile phones, or PDAs (Personal Digital Assistants), etc. The protective cover includes a leather layer 1 and a backing layer 2. The leather layer 1 is made of leather. The shape of the leather layer 1 is designed according to that of the electronic device and the adhering position. In the present embodiment, the shape of the leather layer 1 is a quadrate type.

Two opposite surfaces of a leather layer 1 are an outside surface 11 and a bottom surface 12 respectively. Surfaces of the leather layer 1 can be plain and simple, or, the outside surface 11 of the leather layer 1 can be set with a picture 13 via pressing line, printing, or punching, etc. The types of the picture 13 are unlimited, and the picture 13 can include letters or paintings, thereby providing advertisements or decorations to the surface of the electronic device.

The backing layer 2 is adhered on the bottom surface 12 of the leather layer 1. The backing layer 2 is a layer of glue at its bottom layer and can be repeatedly adhered. The shape of the backing layer 2 corresponds to that of the leather layer 1. The backing layer 2 can cover the entire bottom surface 12 of the leather layer 1, or, the backing layer 2 can cover part of the bottom surface 12 of the leather layer 1. Hence, the protective cover of the electronic device of the present invention is formed by the structure.

Figure 3A:
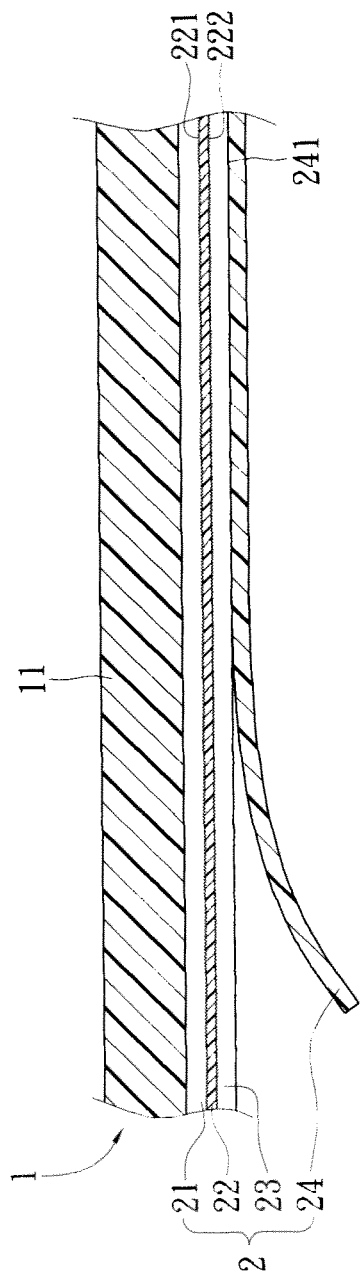
FIG. 3A is a cross-sectional view of the protective cover of the present invention.

Please refer to FIG. 3A, which is a cross-sectional view of the protective cover of the present invention. The backing layer 2 is introduced in detail as followed. The backing layer 2 includes an upper adhesive layer 21 which is attached to the bottom surface of the leather layer 1, a middle substrate 22 attached a bottom surface of the upper adhesive layer 21, and a lower adhesive layer 23 attached to a bottom surface of the middle substrate 22. The upper adhesive layer 21 has a value of bonding strength greater then that of the lower adhesive layer 23.

The upper adhesive layer 21 is used to strongly combine the backing layer 2 with the leather layer 1. The upper adhesive layer 21 could be pressure sensitive adhesive of high bonding-strength. For example, it would be acrylic-based adhesive, rubber-base adhesive, or silicone-base adhesive. The upper adhesive layer 21 also could be thermosetting adhesive of high bonding-strength, for example, polyurethane (PU) based thermosetting adhesive. The value of bonding strength of the upper adhesive layer 21 is greater then 1.0 Kg/square inch, and a preferred value is according to the bottom's condition of the leather layer 1. For example, it can be greater then 2.5 Kg/square inch. The upper adhesive layer 21 could be sprayed on the bottom surface of the leather layer 1. Since the leather layer 1 usually has a rough bottom surface, the upper adhesive layer 21 can help the backing layer 2 to avoid peeling off the leather layer 1.

The middle substrate 22 is disposed between the lower adhesive layer 23 and the upper adhesive layer 21, so that it solves the important matter that how to combine the lower adhesive layer 23 with the upper adhesive layer 21. The middle substrate 22 could be a film or a non-woven fabric. As a film, the middle substrate could be made of Polyethylene terephthalate (commonly abbreviated PET). A preferred way to well bond the middle substrate 22 with the upper and lower adhesive layers 21, 23, upper and lower surfaces of the middle substrate 22 are sprayed with surface-bonding agent 221, 222. The surface-bonding agent is considered according to the adhesive kinds of the upper and lower adhesive layer 21, 23, which should use the same adhesive base. A preferred thickness of the middle substrate 22 is about between 0.05 mm to 0.1 mm. The surfaces of the middle substrate 22 could be a rough surface for increasing bonding ability with the upper and lower adhesive layer 21, 23.

The lower adhesive layer 23 has a bonding strength lower then that of the upper adhesive layer 21, and is adhered with the outside surface of the electronic device. An example of the composition of the lower adhesive layer 23 is silicone-base adhesive. The preferred value of bonding strength of the lower adhesive layer 23 is greater then 0.5 Kg/square inch and smaller then 1 Kg/square inch. Because the adhesive characteristic of the lower adhesive layer 23, the protective cover can be repeatedly adhered with the electronic device. Furthermore, the protective cover can be completely peeled off the electronic device without any residual adhesive remained on the electronic device.

Furthermore, a release layer 24 is attached to a bottom surface of the lower adhesive layer 23 for temporary protecting the protective cover. For the lower adhesive layer 23 of silicone-base adhesive, a preferred embodiment of the release layer is fluoro-silicone release film, which has a polyester film and a fluoride silicone release agent coated on a top surface of the polyester film.

Figure 4:
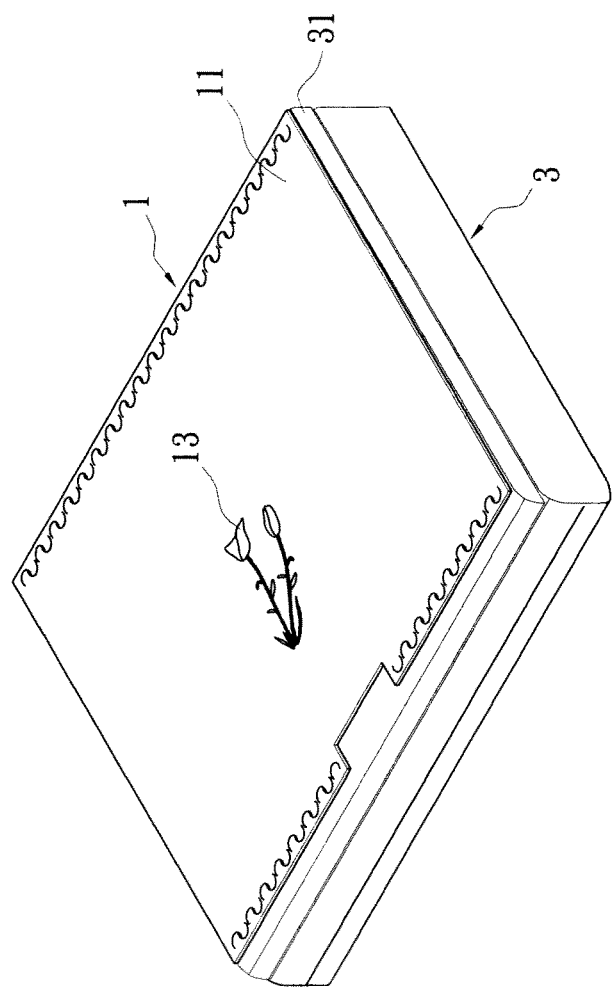
FIG. 4 is an isometric view (1) of the protective cover in use of the present invention.
Figure 5:
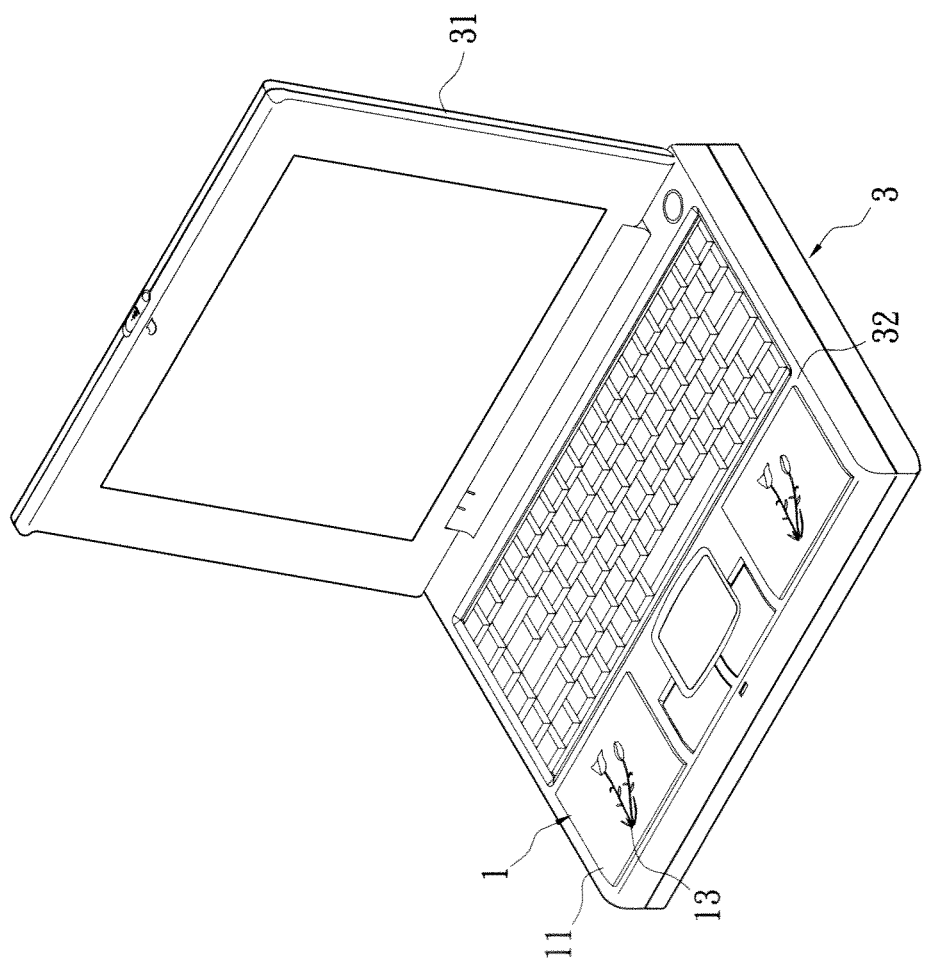
FIG. 5 is an isometric view (2) of the protective cover in use of the present invention.
Figure 6:
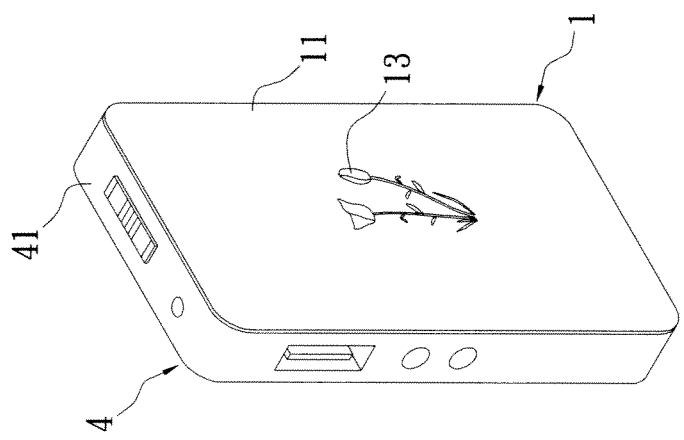
FIG. 6 is an isometric view (3) of the protective cover in use of the present invention.

The protective cover of the present invention can be adhered on the surface of an upper cover 31 of a notebook computer 3 by the backing layer 2 (refer to FIG. 4), or, can be adhered on the surface of a keyboard 32 of the notebook computer 3 (refer to FIG. 5). The shape of the protective cover corresponds to that of the notebook computer 3 and the adhering position. The protective cover of the present invention can be adhered on the surface of a shell 41 of a PDA 4 by the backing layer 2 (refer to FIG. 6).

The protective cover of the present invention can be adhered on the electronic devices such as notebook computers/laptops, digital cameras, mobile phones/smart phones, Global Positioning Systems, MP3/MP4 players, portable media players, and PDAs, etc. Hence, when in use or when it is being carried, the electronic devices are well protected. Other objects are obstructed from colliding directly with the surfaces of the electronic devices. Hence, the surfaces of the electronic devices are prevented form being dirtied, scraped, or damaged, and the appearances of the electronic devices can be well maintained. Also, the inside electronic elements of the electronic devices cannot be damaged.

Moreover, the leather layer 1 and the picture 13 of the present invention is tactile and pleasing to touch and enhances visual effects. Users can feel more comfortable when operating their electronic devices, hence, the worthiness and the usability of the electronic devices are greatly enhanced.

What is disclosed above are only the preferred embodiments of the present invention, and therefore it is intended that the present invention not be limited to the particular embodiment disclosed. It should be understood by those skilled in the art that various equivalent changes may be made depending on the specification and the drawings of present invention without departing from the scope of the present invention.

What is claimed is:

1. A protective cover for an electronic device, comprising:
   a leather layer comprising an outside surface and an bottom surface; and
   a backing layer, integrating with the bottom surface of the leather layer, wherein the backing layer comprises:
   an upper adhesive layer attached to the bottom surface of the leather layer, wherein the upper adhesive layer is acrylic-base adhesive and has a value of bonding strength greater than 1.5 Kg/square inch and smaller than 2 Kg/square inch;
   a middle substrate attached to a bottom surface of the upper adhesive, wherein the middle substrate is sprayed with surface-bonding agent on an upper surface and a lower surface thereof, and wherein the middle substrate is made of polyethylene terephthalate and has a thickness between 0.05 mm to 0.1 mm; and
   a lower adhesive layer attached to a bottom surface of the middle substrate for adhering onto a surface of the electronic device, wherein the lower adhesive layer is silicon-base adhesive and has a value of bonding strength greater than 0.5 Kg/square inch and smaller than 1 Kg/square inch.

2. The protective cover for an electronic device as claimed in claim 1, wherein the leather layer has a plain surface.

3. The protective cover for an electronic device as claimed in claim 1, wherein the outside surface of the leather layer is set with a picture.

4. The protective cover for an electronic device as claimed in claim 3, wherein the picture comprises letters or painting.

5. The protective cover for an electronic device as claimed in claim 1, wherein the backing layer has a kind of glue and can be repeatedly adhered.

6. The protective cover for an electronic device as claimed in claim 1, wherein the backing layer covers the entire bottom surface of the leather layer.

7. The protective cover for an electronic device as claimed in claim 1, wherein the backing layer covers part of the bottom surface of the leather layer.

8. The protective cover for an electronic device as claimed in claim 1, wherein the electronic device is a notebook computer/laptop, a digital camera, a mobile phone/smart phone, a Global Positioning System, a MP3/MP4 player, a portable media player, or a PDA.

9. The protective cover for an electronic device as claimed in claim 1, further comprising a release layer attached to the lower adhesive layer.

10. The protective cover for an electronic device as claimed in claim 1, further comprising a release layer attached to the lower adhesive layer, wherein the release layer has a polyester film and a fluoride silicone release agent coated on a top surface of the polyester film.

* * * * *